(12) United States Patent
Pessoa

(10) Patent No.: US 8,483,384 B2
(45) Date of Patent: Jul. 9, 2013

(54) ENHANCED TONE DETECTOR INCLUDING ADAPTIVE MULTI-BANDPASS FILTER FOR TONE DETECTION AND ENHANCEMENT

(75) Inventor: Lucio F. C. Pessoa, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 2017 days.

(21) Appl. No.: 11/368,729

(22) Filed: Mar. 6, 2006

(65) Prior Publication Data

US 2007/0263842 A1 Nov. 15, 2007

(51) Int. Cl.
*H04M 1/00* (2006.01)

(52) U.S. Cl.
USPC ....... 379/386; 379/283; 379/372; 379/387.02

(58) Field of Classification Search
USPC ................ 370/286, 290; 379/406.08, 406.01, 379/283, 372, 386, 387.02
See application file for complete search history.

(56) References Cited

U.S. PATENT DOCUMENTS

| 5,241,688 A | 8/1993 | Arora |
| 5,392,348 A | 2/1995 | Park et al. |
| 6,587,559 B1 | 7/2003 | Bartkowiak |
| 2002/0076034 A1 | 6/2002 | Prabhu et al. |
| 2004/0001450 A1* | 1/2004 | He et al. ........................ 370/286 |
| 2004/0047370 A1 | 3/2004 | Pessoa et al. |
| 2004/0047464 A1 | 3/2004 | Yu et al. |
| 2005/0195967 A1 | 9/2005 | Pessoa et al. |

OTHER PUBLICATIONS

D.R. Hush et al., *An adaptive IRR structure for sinusoidal enhancement, frequency estimation, and detection*, IEEE Trans. On ASSP, vol. 34, No. 6, Dec. 1986, pp. 1380-1390.
International Search Report and Written Opinion for correlating PCT Patent Application No. PCT/US07/61190 dated Sep. 12, 2008.

\* cited by examiner

*Primary Examiner* — Gerald Gauthier
*Assistant Examiner* — Simon King
(74) *Attorney, Agent, or Firm* — Gary Stanford

(57) ABSTRACT

An enhanced tone detector including an adaptive multi-bandpass filter, a tone detector and a filter control unit. The adaptive multi-bandpass filter has a signal input receiving an input signal, a signal output providing a filtered signal, and at least one control input for receiving at least one control signal. The tone detector has an input coupled to the signal output of the adaptive multi-bandpass filter and at least one output providing at least one tone detection signal when a tone event is detected. The filter control unit has a first input receiving the input signal, at least one second input receiving the at least one tone detection signal, and at least one first output providing the at least one control signal. The control signals may include one or more frequency component signals and corresponding bandwidth signals in which the frequency component signals correspond to component frequencies of a tone event.

20 Claims, 5 Drawing Sheets

ENHANCED TONE DETECTOR INCLUDING ADAPTIVE MULTI-BANDPASS FILTER FOR TONE DETECTION AND ENHANCEMENT

BACKGROUND OF THE INVENTION

1. Field of the Invention

The present invention relates in general to tone event detection and enhancement, and more specifically to an enhanced tone detector with and adaptive multi-bandpass filter which improves tone detection and enhances performance during high noise signaling conditions.

2. Description of the Related Art

Tone event detection is an important application in digital telephony systems having shared data and voice communication over the telephone network. The International Telecommunication Union (ITU) has been developing a standard for data transmission (V-series modem signals) over packet networks (V.150), which defines inter-operation between Public Switched Telephone Network (PSTN) and Internet Protocol (IP) networks. Prior to or during data transmission, a series of tone events are exchanged, so that whenever a tone event is detected, specific actions need to be taken for initiating and maintaining proper data communication over IP.

A tone event may include a single tone or a combination of multiple tone segments having different modulation schemes. For example, a tone event may include a single frequency tone with an on/off amplitude modulation (AM). In another example, a tone event may include a dual frequency component tone followed by a single frequency tone. In yet another example, a tone event may include a single frequency tone having periodic phase changes. Therefore, it is desirable to reliably detect tone events according to different modulation schemes. Some typical tone events that may be detected include T.30 Calling Tone (CNG), V.25 Calling Tone (CT), V.25 Answering Tone (ANS)/T.30 CED, V.25 Answering Tone with Phase Reversal (ANS_PR), V.8 Answering Tone with Amplitude Modulation (ANSam), V.8 Answering Tone with Amplitude Modulation and Phase Reversal (ANSam_PR), V.22 Unscrambled Binary Ones (USB1), V.21 Channel 2 HDLC flag, TIA/EIA-825 TTY tones, V.8bis Initiate/Respond, Q.24 Dual Tone Multiple Frequency (DTMF), Multiple Frequency Tones (e.g. MFR1, MFR2), etc. These tone events are modulated by magnitude, frequency, or phase, or any combination thereof. Furthermore, these tone events may include more than one frequency component per segment of the signal having the same tone characteristics.

Tone detectors are frequently used in communication systems for monitoring the receive signals and identifying the presence of pre-defined signaling tones. There are many practical situations, however, when signaling tones are highly corrupted by noise, which may end up disrupting expected tone detection functionality. New tone detection methods have been developed which attempt to handle noisy situations via post-processing low-pass filtering. Due to frequency and timing tolerance requirements, however, missed detection rates tend to increase as noise distortion increases beyond critical levels. Therefore, there is a need to identify noisy conditions, and selectively filter the signal to increase signal-to-noise ratio (SNR) in order to expand tone detection operation range.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
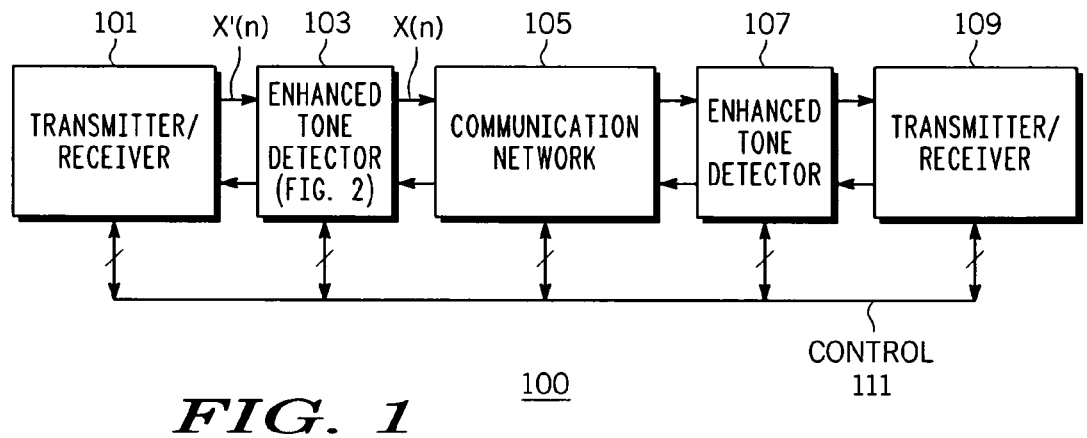
FIG. 1 is a block diagram of a communication system in accordance with one embodiment of the present invention.

FIG. 1 is a block diagram of a communication system 100 in accordance with one embodiment of the present invention. The communication system 100 includes a transmitter/receiver 101, an enhanced tone detector 103, a communication network 105, an enhanced tone detector 107, a transmitter/receiver 109, and a control bus 111. The control bus 111 is bidirectionally coupled to the transmitter/receiver 101, the enhanced tone detector 103, the communication network 105, the enhanced tone detector 107, and the transmitter/receiver 109. The transmitter/receiver 101 is bidirectionally coupled to the enhanced tone detector 103, which is bidirectionally coupled to the communication network 105, which is bidirectionally coupled to the enhanced tone detector 107, which is bidirectionally coupled to the transmitter/receiver 109.

The transmitter/receiver 101 provides and receives data signals via the enhanced tone detector 103 to the communication network 105. Similarly, the transmitter/receiver 109 provides and receives data signals via the enhanced tone detector 107 to the communication network 105. Therefore, the transmitter/receivers 101 and 109 are able to communicate with each other through the communication network 105. The transmitter/receivers 101 and 109 can each be any device used for communicating over the communication network 105, such as, for example, a telephone, a modem, etc.

Also, the communication network 105 may include a packet telephony network (including, for example, voice over internet protocol (IP), data over packet, asynchronous transfer mode (ATM), etc., and could either apply to wireless or wireline systems or Public Switching Telephone Network (PSTN). In alternate embodiments, the communication system 100 may refer to any type of communication system.

The control bus 111 provides a control pathway among the transmitter/receivers 101 and 109, the enhanced tone detectors 103 and 107, and the communication network 105. The control signals transmitted via the control bus 111 are generally not in-line signals. For example, the control bus 111 may include an enabling/disabling signal to enable or disable the enhanced tone detectors 103 or 107, or may include signals that need to be communicated among various portions of the enhanced tone detectors 103 or 107. The control bus 111 may also include a signal to indicate whether the telephone is on or off the hook. Also note that the control bus 111 may include an encoded version of the transmit signal such as, for example, according to the RFC2833 standard.

Note that operation of the transmitter/receiver 101 and the enhanced tone detector 103 is analogous to the operation of the transmitter/receiver 109 and the enhanced tone detector 107. That is, the communication system 100 is symmetrical. Furthermore, although embodiments of the present invention are presented using the transmit signal, tone event detection can be performed on either transmit or receive signals (i.e. signals going to or coming from the communication network 105). The transmitter/receiver 101 provides a send or transmit signal, labeled x'(n) to the enhanced tone detector 103. The x'(n) signal is a sampled signal including samples at a rate according to a sampling frequency $f_s$. The x'(n) signal can include normal speech or can include a tone event according to a particular modulation scheme, such as AM, Frequency Shift Keying (FSK), Differential Phase Shift Keying (DPSK), etc. As described further below, the enhanced tone detector 103 filters the x'(n) signal and provides an enhanced signal x(n) to the communication network 105.

For example, a TTY phone (not shown) enables voice and text communication over a communication network, such as the communication network 105. A TTY phone typically includes a built in keyboard which allows for text communication. That is, for each key pressed, a corresponding character string is generated. The generated character string corresponds to an FSK modulated tone event. Any pressed key of a TTY phone generates a tone event having seven (7) FSK modulated tones including a start bit tone, 5 data bit character set tones, and a stop bit tone. Therefore, in this case, a tone event includes seven individual tone segments. In one case (such as, for example, when the communication network is a packet telephony network), information relating to the tone event is transmitted to a receiver so that the tone event can be re-created locally at the receiver side. That is, upon the transmitter (for example, the transmitter 101) detecting a start bit tone generated by the TTY phone, the transmitter may suppress the remaining tones until a tone event is detected, at which point, the transmitter sends information relating to the tone event to a receiver (for example, the receiver 109) which can then locally re-create the tone event from the sent information. In one case, this information is transmitted over control lines such as the control bus 111 rather than via the communication network 105. Alternatively, the information or the tones of the tone event can be sent directly over the communication network 105.

Figure 2:
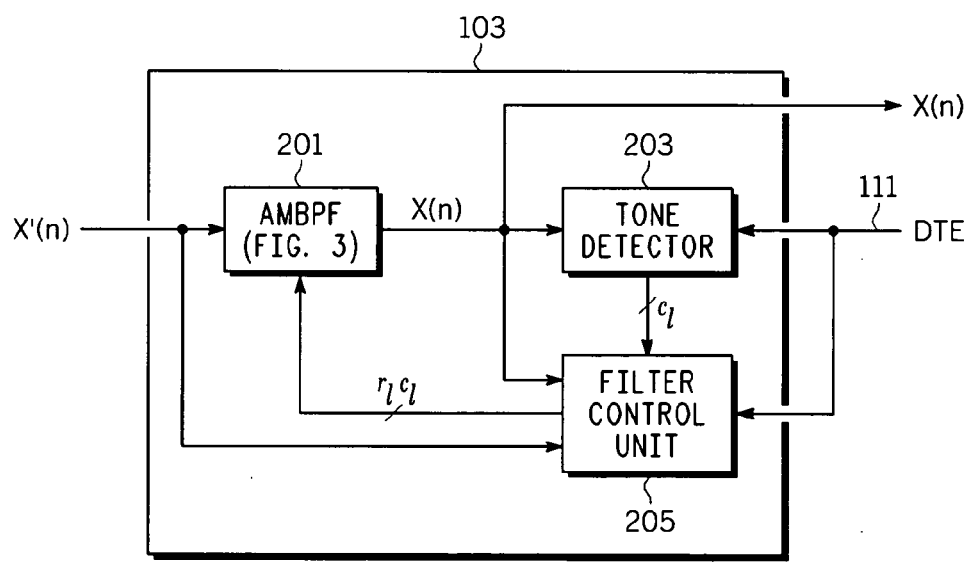
FIG. 2 is a block diagram of the enhanced tone detector of FIG. 1 implemented according to an exemplary embodiment of the present invention.

FIG. 2 is a block diagram of the enhanced tone detector 103 implemented according to an exemplary embodiment of the present invention. The enhanced tone detector 103 includes an adaptive multi-bandpass filter (AMBPF) 201, a tone detector 203 and a filter control unit 205. The x'(n) signal is provided to respective inputs of the adaptive multi-bandpass filter 201 and the filter control unit 205. The adaptive multi-bandpass filter 201 has an output providing the x(n) signal to respective inputs of the tone detector 203 and the filter control unit 205. The tone detector 203 has a first output coupled to the control bus 111 for providing a detected tone or symbol, shown as DTE. In the embodiment illustrated, the tone detector 203 has one or more second outputs providing up to a number "N" of frequency component signals $c_l$, in which "l" is an index from 1 to N and in which "N" is a positive integer greater than zero. The frequency component signals $c_l$ are provided to corresponding inputs of the filter control unit 205. In the embodiment illustrated, the filter control unit 205 forwards or passes the frequency component signals $c_l$ to the adaptive multi-bandpass filter 201 and further provides a corresponding one or more bandwidth controls signals $r_l$. As further described below, the filter control unit 205 provides the $c_l$, $r_l$ signals to adjust or update the adaptive multi-bandpass filter 201 to enhance the quality of the x(n) signal relative to the unfiltered x'(n) signal. The filter control unit 205 is also shown as bidirectionally coupled to the control bus 111 to enable external control or programming if necessary or desired.

The tone detector 203 estimates the frequency and amplitude components of the x(n) signal and recursively tunes the estimates to establish a frequency lock on the estimated frequency component(s). If frequency lock is achieved, then a tone or tone event is indicated and the tone detector 203 generates one or more of the frequency component signals $c_l$. Each frequency component $c_l$ is a function of a corresponding normalized frequency parameter $\theta_l$ according to the following equation 1:

$$c_l = \cos \theta_l \quad (1)$$

in which the normalized frequency parameter $\theta_l$ is determined according to the following equation 2:

$$\theta_l = 2\pi f_l / f_s \quad (2)$$

where $f_l$ is the frequency of a corresponding tone component and $f_s$ is the sampling frequency of the x'(n) signal.

In alternative embodiments, the tone detector 203 may be implemented according to other methods which provide tone indication or frequency component information as known to those skilled in the art. For example, the tone detector 203 may provide the frequency signals $f_l$ or the normalized frequency parameters $\theta_l$ directly rather than functions thereof. In either case, the filter control unit 205 converts the frequency signals $f_l$ or the normalized frequency parameters $\theta_l$ into the appropriate information needed by the adaptive multi-bandpass filter 201, such as the frequency component signals $c_l$ previously described. If the complete set of frequency components of a predetermined tone set is known beforehand by the filter control unit 205, then the tone detector 203 may be implemented to provide any sufficient indication of the particular one or more frequencies of an indicated tone and the filter control unit 205 converts the provided information into the appropriate information needed by the adaptive multi-bandpass filter 201, such as the frequency component signals $c_l$ previously described.

In one embodiment, the filter control unit 205 initially asserts the $r_l$ signals to program the adaptive multi-bandpass filter 201 as an all-pass filter (for example by setting $r_l=0$). The tone detector 203 monitors the incoming samples of the x(n) signal (which is initially the same as the x'(n) signal) and provides the $c_l$ signals only if and when a tone is indicated. For example, the tone detector 203 periodically estimates a tone and recursively adjusts the estimate until it is confirmed after a first predetermined number of samples or after a predetermined amount of time. If the estimate remains confirmed after a second predetermined number of samples or a second predetermined amount of time, then the tone detector 203 verifies the tone and outputs a detected tone event (DTE). Meanwhile, when the filter control unit 205 receives the $c_l$ signals, it begins adjusting the adaptive multi-bandpass filter 201 to improve and enhance the signal quality of the input signal to improve the tone event detection process of the tone detector 203. In conventional configurations, the x'(n) signal is provided to the communications network 105. The enhanced tone detector 103 instead provides the x(n) signal, which is a filtered and enhanced version of the x'(n) signal.

Figure 3:
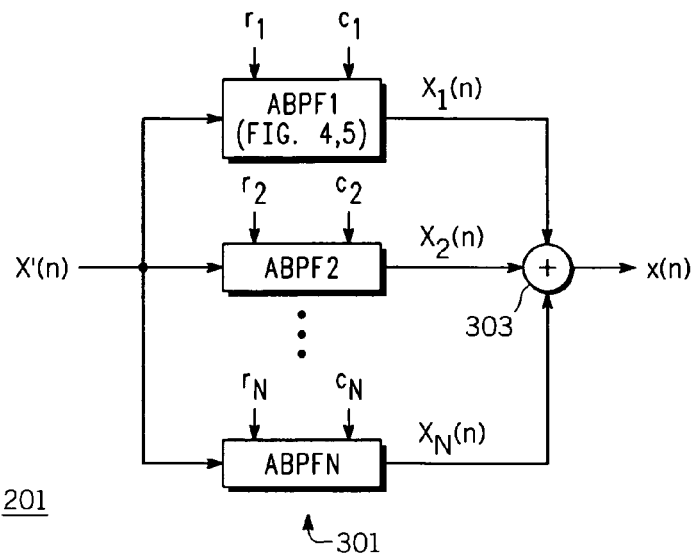
FIG. 3 is a simplified block diagram of the adaptive multi-bandpass filter of FIG. 2 implemented according to an exemplary embodiment of the present invention.

FIG. 3 is a simplified block diagram of the adaptive multi-bandpass filter 201 implemented according to an exemplary embodiment of the present invention. In the illustrated configuration, the adaptive multi-bandpass filter 201 is configured as a parallel combination of N adaptive bandpass filters (ABPF) 301 from a first filter ABPF1 to a last ABPFN (i.e., ABPF1, ABPF2, ..., ABPFN). Each ABPF 301 is configured as an infinite impulse response (IIR) filter having a signal input receiving the x'(n) signal, a first control input receiving a corresponding one of the frequency component signals $c_l$ (i.e., $c_1$, $c_2$, ..., $c_N$), a second control input receiving a corresponding one of the bandwidth control signals $r_l$ (i.e., $r_1$, $r_2$, ..., $r_N$), and an output providing a corresponding filtered output signal $x_l(n)$ (i.e., $x_1(n)$, $x_2(n)$, ..., $x_N(n)$). The filtered output signals $x_l(n)$ are summed together by an adder 303, which outputs the filtered x(n) signal.

In the embodiment illustrated, the ABPFs 301 collectively have a filter structure that operates according to the following equation 3:

$$H(z) = \sum_{l=1}^{N} H_l(z), \; H_l(z) = \frac{1 - r_l^2 - 2r_l(1 - r_l)c_l z^{-1}}{1 - 2r_l c_l z^{-1} + r_l^2 z^{-2}} \quad (3)$$

which is one or more second order IIR filters each having complex-conjugate poles $r_l e^{\pm j\theta_l}$ and a single zero $$2\frac{r_l}{1+r_l}\cos\theta_l.$$

This particular structure has the property of maximum unit gain with no phase change at the pole locations, which is according to the property illustrated by the following equation 4:

$$H_l(e^{j\theta_l}) = 1 \quad (4)$$

The magnitude of the poles are chosen to ensure overall filter stability, which means that the bandwidth control parameters $r_l$ are chosen such that $0 \leq r_l < 1$. As illustrated by equation 3, the filter control unit 205 initializes the adaptive multi-bandpass filter 201 as an all-pass filter by programming the bandwidth control parameters $r_l$ to zero.

Figure 4:
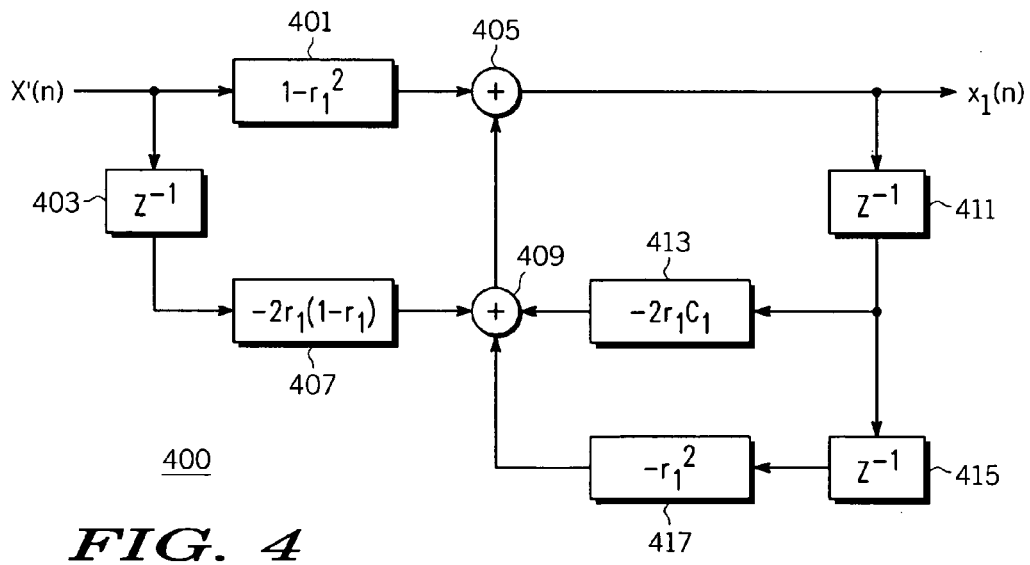
FIG. 4 is a simplified block diagram of an adaptive bandpass filter (ABPF) for implementing the first filter of FIG. 3 according to an exemplary embodiment of the present invention.

FIG. 4 is a simplified block diagram of an adaptive bandpass filter 400 for implementing the first filter ABPF1 according to an exemplary embodiment of the present invention. The adaptive bandpass filter 400 receives the first set of frequency and bandwidth control values $r_1$, $c_1$. The x'(n) signal is provided to respective inputs of a function block 401 and a delay block 403. The function block 401 multiplies the incoming sample of the x'(n) signal by $[1-r_1^2]$ and provides the result to one input of an adder 405. The delay block 403, with notation $z^{-1}$, delays the incoming sample of the x'(n) signal by one sample value and provides the delayed sample value to the input of a function block 407, which multiplies the delayed sample value by $[-2r_1(1-r_1)]$. The output of the function block 407 is provided to one input of an adder 409, having its output provided to a second input of the adder 405. The output of the adder 405 provides the $x_1(n)$ signal at its output. As understood by those skilled in the art, the output of the function block 407 is delayed by one sample value relative to the output of the function block 401. Each sampled filter value of $x_1(n)$ provided at the output of the adder 405 is delayed by delay block 411, which outputs a delayed $x_1(n)$ value to respective inputs of a function block 413 and another delay block 415. The function block 413 multiplies the delayed $x_1(n)$ value by $[2r_1 c_1]$ and provides the result to a second input of the adder 409. The delay block 415 delays the delayed $x_1(n)$ value by another sample time and provides the delayed result to the input of another function block 417, which multiplies the delayed result by $[-r_1^2]$. The series combination of the delay blocks 411 and 415 delay the $x_1(n)$ samples by two sample values (i.e., to multiply each sample value by $z^{-2}$). The output of the function block 417 is provided to a third input of the adder 409. In this manner, as appreciated by those skilled in the art, the adaptive bandpass filter 400 performs the function of equation 3 for the first set of frequency and bandwidth control values $r_1$, $c_1$ to provide the filtered sampled signal $x_1(n)$. The adaptive bandpass filter 400 may be used to implement any or all of the ABPF 301 of the adaptive multi-bandpass filter 201 to provide the filtered sampled signals $x_1(n)$ to $x_N(n)$, which samples are added together by the adder 303 to develop the x(n) signal.

Figure 5:
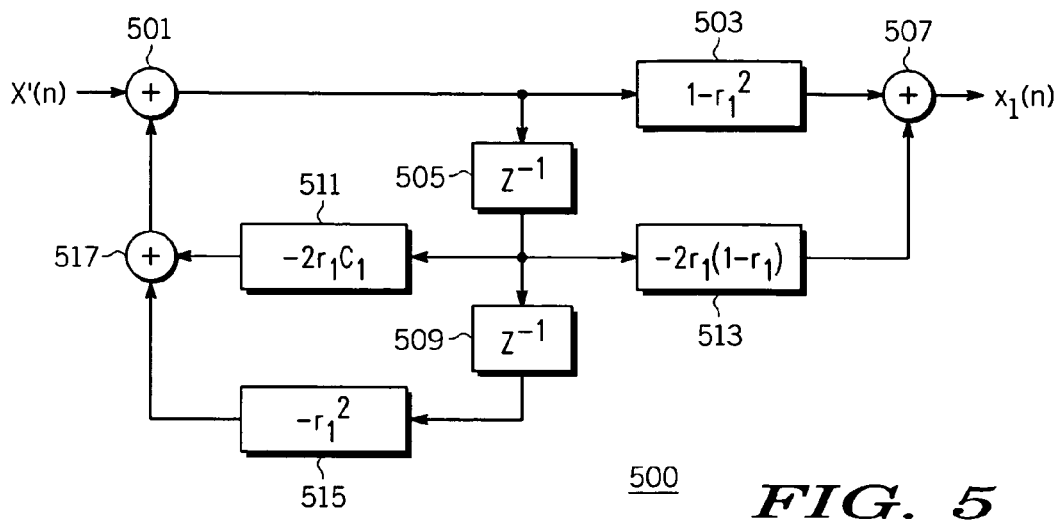
FIG. 5 is a simplified block diagram of an adaptive bandpass filter for implementing the first filter of FIG. 3 according to another embodiment of the present invention.

FIG. 5 is a simplified block diagram of an adaptive bandpass filter 500 for implementing the first filter ABPF1 according to another embodiment of the present invention. The adaptive bandpass filter 500 also receives the first set of frequency and bandwidth control values $r_1$, $c_1$. The x'(n) signal is provided to one input of an adder 501, having an output provided to respective inputs of a function block 503 and a delay block 505. The function block 503 multiplies the output of the adder 501 by $[1-r_1^2]$ and provides the result to one input of an adder 507. The output of the delay block 505 is provided to the respective inputs of another delay block 509 and two function blocks 511 and 513. The output of the delay block 509 is provided to the input of a function block 515, which multiplies the output of the delay block 509 by $[-r_1^2]$ and provides the result to one input of an adder 517. The function block 511 multiplies the output of the delay block 505 by $[2r_1 c_1]$ and provides the result to the other input of the adder 517. The output of the adder 517 is provided to the other input of the adder 501. The function block 513 multiplies the output of the delay block 505 by $[-2r_1(1-r_1)]$ and provides the result to the other input of the adder 507. The output of the adder 507 provides the sampled filter value $x_1(n)$. In this manner, as appreciated by those skilled in the art, the adaptive bandpass filter 500 also performs the function of equation 3 for the first set of frequency and bandwidth control values $r_1$, $c_1$ to provide the filtered sampled signal $x_1(n)$. The adaptive bandpass filter 500 may be used to implement any or all of the ABPF 301 of the adaptive multi-bandpass filter 201 to provide the filtered sampled signals $x_1(n)$ to $x_N(n)$, which samples are added together by the adder 303 to develop the x(n) signal.

The adaptive bandpass filters 400 or 500 may be implemented in any suitable manner as known to those skilled in the art, such as by discrete logic, circuits integrated onto a chip or integrated circuit (IC), software, etc. In a software configuration, the values of $r_i$ and $c_i$ are stored in a memory device along with samples of the $x_i(n)$ signal and the $x'(n)$ signal and other intermediate state signals as the input signal is propagated through the filter. The number N is selected based on the tone event of the selected modulation scheme or tone set which has the highest number of frequency components. The number of frequency components for any given tone event in certain tone sets varies from one tone event to another when the number of frequency components of each tone events of a given tone set varies. Each ABPF 301 is programmed according to the frequency component signal $c_i$ provided by the filter control unit 205. And the corresponding bandpass control value $r_i$ determines the width of the frequency band centered at the corresponding frequency. Frequency components at the center frequency pass through with unity gain and no phase shift. Frequency components above and below the center frequency are attenuated based on the value of $r_i$. If the corresponding $r_i$ value is zero, then the filter is programmed into all-pass configuration such that the input signal passes through without filtering. As the level of the corresponding $r_i$ value is increased above zero, the corresponding frequency passband decreases so to filter out frequency components above and below the programmed center frequency.

Figure 6:
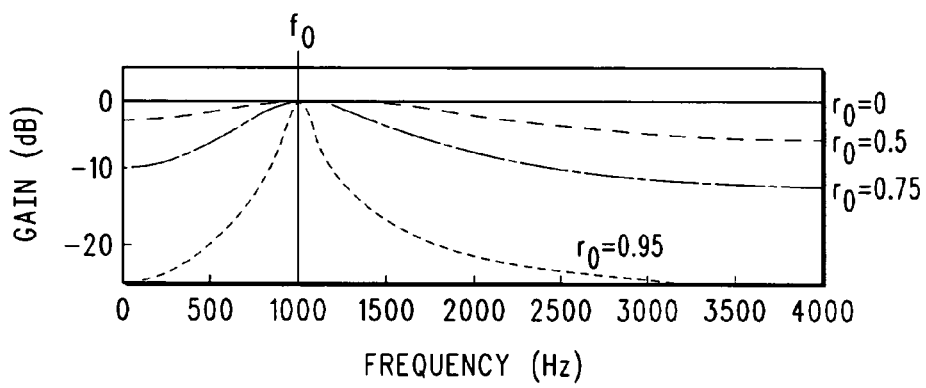
FIG. 6 is a graphic diagram plotting gain (dB) versus frequency (Hz) of a transfer function of an exemplary ABPF of FIG. 3 for a selected component frequency $f_0$ of 1 Kilohertz (kHz) for various values of a corresponding bandwidth control signal.

FIG. 6 is a graphic diagram plotting gain (dB) versus frequency (Hz) of a transfer function of an exemplary ABPF 301 for a selected component frequency $f_0$ of 1 Kilohertz (kHz) for various values of a corresponding bandwidth control signal $r_0$. For $r_0=0$, the gain is unity for across the entire relevant frequency spectrum (e.g., up to one-half the sampling frequency $f_s$ according to the Nyquist criterion; the sampling frequency $f_s$ is 8 kHz in the embodiment illustrated). As the value of $r_0$ is increased above zero, the frequency bandwidth centered decreases or narrows so that the amplitudes of the frequency components above and below the programmed center frequency $f_0$ (e.g., 1 kHz) are reduced. When $r_0$ is increased to 0.5, there is some attenuation for frequencies above and below the selected component frequency $f_0$ (e.g., frequency components at 3 kHz are attenuated by almost 5 dB). The attenuation is increased for $r_0=0.75$ (e.g., frequency components at 3 kHz are attenuated by approximately 10 dB). The attenuation is further increased for $r_0=0.95$ (e.g., frequency components at 3 kHz are attenuated by almost 25 dB). Regardless of the value of $r_0$, the frequency components at $f_0=1$ kHz pass through the ABPF 301 with a gain of 0 dB or unity gain.

Figure 7:
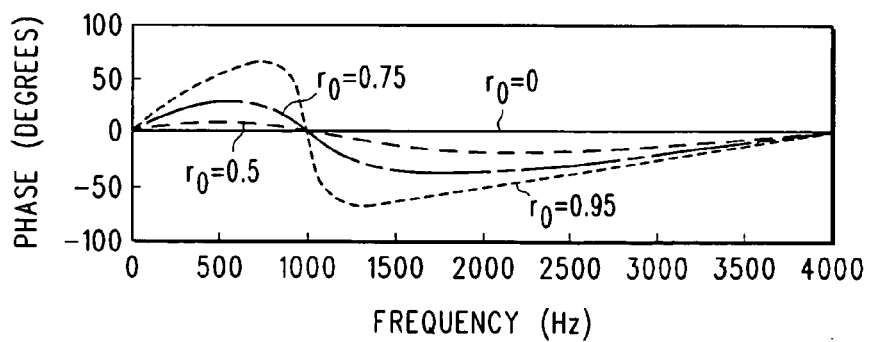
FIG. 7 is a graphic diagram plotting phase (degrees) versus frequency (Hz) of the same transfer function of FIG. 6 for the same values of the bandwidth control signal.

FIG. 7 is a graphic diagram plotting phase (degrees) versus frequency (Hz) of the same transfer function of FIG. 6 for the same values of the bandwidth control signal $r_0$. The phase change is zero (no phase shift) for the selected component frequency $f_0=1$ kHz. There is a significant phase shift (up to over 50 degrees) for frequency components above or below $f_0$.

The bandwidth control signals $r_i$ are adjusted incrementally since each change results in a transient event. The amount of adjustment of the bandwidth control signals $r_i$ depends upon the particular tone events of a given configuration. If a tone event is relatively long or if the distortion noise level $L_{NOISE}$ of the $x'(n)$ signal is relatively high, then the bandwidth control signals $r_i$ are adjusted more slowly. If the tone event is relatively short or if $L_{NOISE}$ is relatively low (even if above $L_{TH}$), then the bandwidth control signals $r_i$ may be increased more quickly.

Figure 8:
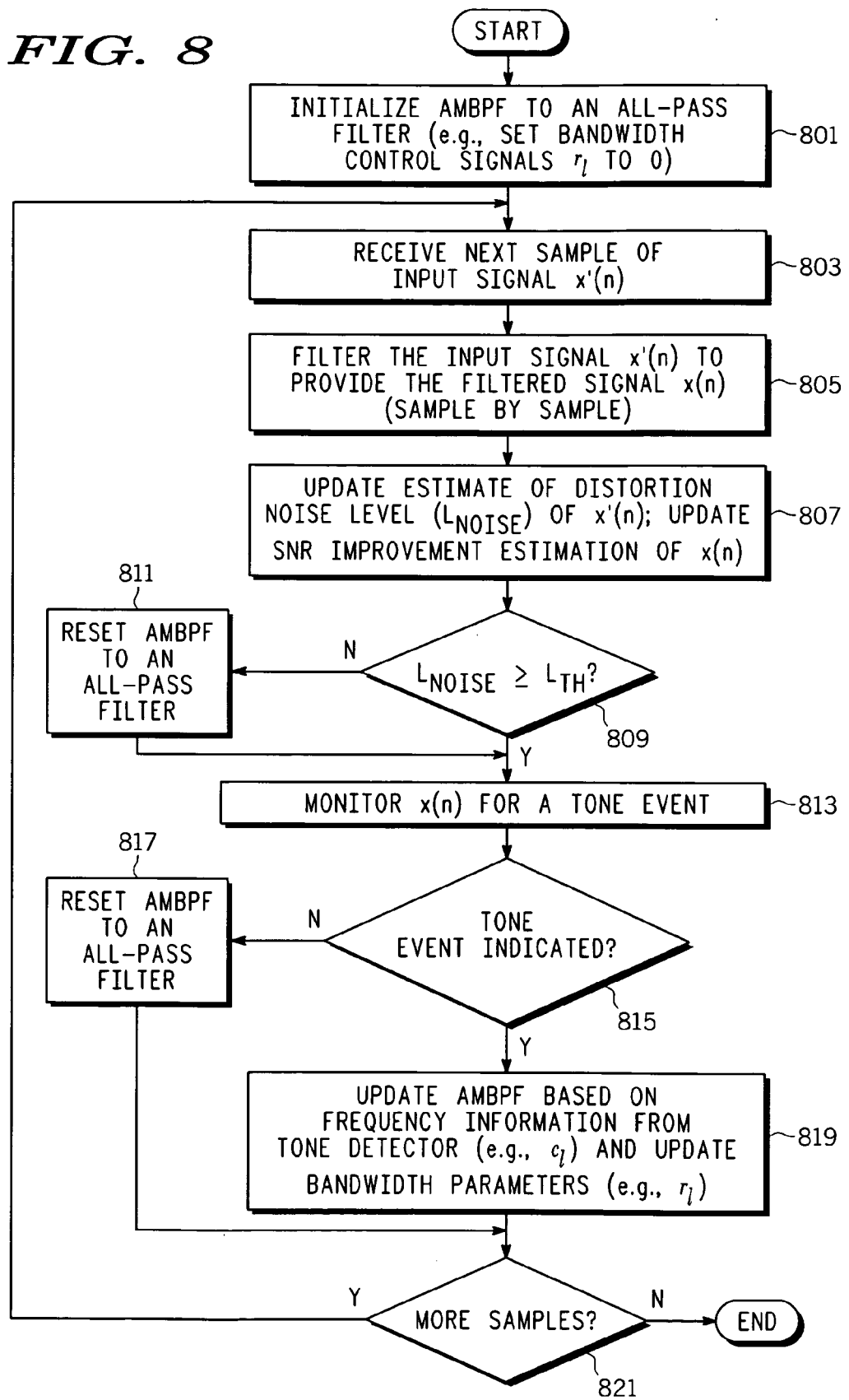
FIG. 8 is a flowchart diagram illustrating operation of the adaptive multi-bandpass filter of FIG. 2 according to an exemplary embodiment of the present invention.

FIG. 8 is a flowchart diagram illustrating operation of the adaptive multi-bandpass filter 201 according to an exemplary embodiment of the present invention. At a first block 801, the filter control unit 205 initializes the adaptive multi-bandpass filter 201 to an all-pass filter. In the embodiment illustrated, this is achieved by setting all of the bandwidth controls signals $r_i$ to zero so that the $x'(n)$ signal effectively passes through the adaptive multi-bandpass filter 201 unchanged (e.g., $x(n) \approx x'(n)$). In other embodiments, the adaptive multi-bandpass filter 201 may be either temporarily disabled or bypassed. At next block 803, the next sample of the $x'(n)$ signal is received. At next block 805, the $x'(n)$ signal is filtered by the adaptive multi-bandpass filter 201 on a sample by sample basis. As appreciated by those of ordinary skill in the art, samples of the $x'(n)$ signal propagate through the adaptive multi-bandpass filter 201 generating a corresponding stream of samples of the filtered $x(n)$ signal. If the bandwidth controls signals $r_i$ are set to zero, then the samples effectively pass through unmodified (no attenuation or phase change). At next block 807, the filter control unit 205 generates or otherwise updates an estimate of the distortion noise level ($L_{NOISE}$) of the $x'(n)$ signal. The filter control unit 205 also generates or updates a signal-to-noise ratio (SNR) improvement of the $x(n)$ signal due to filtering of the $x'(n)$ signal. In one embodiment, a method to estimate power levels is by low-pass filtering $|x'(n)|^k$ and $|x(n)|^k$ with $k=1, 2, \ldots$ etc. The parameter k may be set equal to 2 and a single-pole low-pass filter having a form according to the following equation 5:

$$H(z) = \frac{1-a}{1-az^{-1}}, \text{ for } 0 < a < 1 \tag{5}$$

Equation 5 implies that power estimates (P) may be determined according to the following equations 6 and 7:

$$P_{x'}(n) = aP_{x'}(n-1) + (1-a)x'(n)^2 \tag{6}$$

$$P_x(n) = aP_x(n-1) + (1-a)x(n)^2 \tag{7}$$

In this manner, an SNR improvement $Q(n)$ is estimated by taking the ratio of the power estimates as provided in the following equation 8:

$$Q(n) = \frac{P_{x'}(n)}{P_x(n)} \tag{8}$$

and expressed in decibels (dB), or $10 \log_{10}(Q(n))$.

At next block 809, it is queried whether $L_{NOISE}$ is greater than or equal to a predetermined threshold noise level $L_{TH}$. If $L_{NOISE}$ is less than $L_{TH}$, then operation proceeds to block 811 in which the adaptive multi-bandpass filter 201 is reset to an all-pass filter, such as by setting the bandwidth controls signals $r_i$ to zero. In this case if the noise level of the $x'(n)$ signal is sufficiently low such that tone events are easily discernible, so there is less need to enhance the signal through filtering. If $L_{NOISE}$ is greater than or equal to $L_{TH}$ as determined at block 809, or after block 811 is performed, operation proceeds to block 813 in which the tone detector 203 monitors the filtered $x(n)$ signal for any tone events. It is appreciated that as samples of the $x(n)$ signal propagate through the tone detector 203, the tone detector 203 continuously monitors for tone events. At next block 815, it is queried whether a tone event has been indicated. As previously described, when the tone detector 203 detects a tone event or otherwise locks onto one or more frequency components of a tone, it provides the corresponding frequency control signals $c_i$ to the filter control unit 205. It is noted that for alternative embodiments, any function of frequency may be provided by the tone detector 203, in which case the filter control unit 205 is responsible for converting them to equivalent values of $c_i$. If a tone event is not indicated as determined at block 815, then operation proceeds to block 817 to reset the adaptive multi-bandpass filter 201 to an all-pass filter as previously described. If a tone event has not yet been indicated, is lost during transmission, or after a tone event is complete, it is desired to reset the adaptive multi-bandpass filter 201 for enabling the tone detector 203 to detect the next tone event.

If a tone event is indicated at block 815, operation proceeds to block 819 in which the adaptive multi-bandpass filter 201 is updated based on the frequency information from the tone detector, e.g., the frequency component signals $c_l$ and the bandwidth control signals $r_l$. As previously described, each bandwidth control signal $r_l$ tunes or filters a corresponding frequency component of a corresponding frequency component as indicated by the corresponding one of the frequency component signals $c_l$. After the adaptive multi-bandpass filter 201 has been reset in block 817 or updated in block 819, operation proceeds to block 821 to determine whether there are more input samples to process. If not, operation is completed and if so, operation proceeds back to block 803 for the next input sample.

Figure 9:
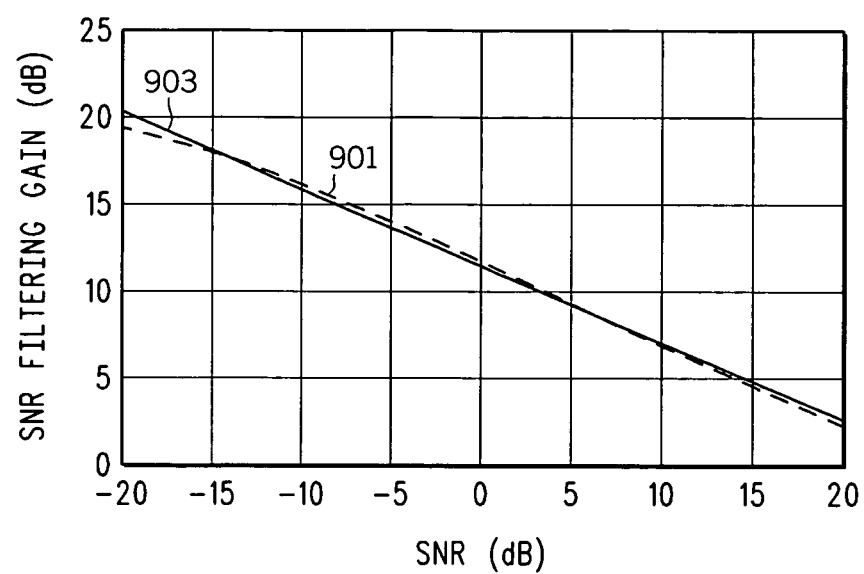
FIG. 9 is a graphic diagram plotting SNR filtering gain (dB) versus SNR (dB) based on 1000 random trials (per dB) of a five component (i.e., N=5) tone detection application.

FIG. 9 is a graphic diagram plotting SNR filtering gain (dB) versus SNR (dB). A first line 901 is average SNR gain based on 1000 random trials (per dB) of a five component (i.e., N=5) tone detection application. A second line 903 illustrates SNR gain as $SNR_{GAIN} \approx -0.45*SNR+11.37$. The average SNR gain was greater than 10 dB for input signals having an SNR of less than 3 dB, which is a substantial improvement over the prior art.

An enhanced tone detector according to an embodiment of the present invention includes an adaptive multi-bandpass filter, a tone detector and a filter control unit. The adaptive multi-bandpass filter has a signal input receiving an input signal, a signal output providing a filtered signal, and at least one control input for receiving at least one control signal. The tone detector has an input coupled to the signal output of the adaptive multi-bandpass filter and at least one output providing at least one tone detection signal when a tone event is detected. The filter control unit has a first input receiving the input signal, at least one second input receiving the at least one tone detection signal, and at least one first output providing the at least one control signal.

The adaptive multi-bandpass filter may include multiple adaptive bandpass filters, each having a corresponding frequency control input, where the filter control unit provides a frequency component signal to each of the frequency control inputs. In one embodiment the tone detector detects a tone event and provides the frequency component signals which are provided to the adaptive multi-bandpass filter. In alternative embodiments, the filter control unit converts the tone detector signals to the appropriate frequency component signals. Each adaptive bandpass filter may include a bandwidth control input, where the filter control unit provides a bandwidth control signal to each bandwidth control input.

The control input of the adaptive multi-bandpass filter may include at least one frequency control input and at least one bandwidth control input. In this case the filter control unit provides one or more frequency component signals to the one or more frequency control inputs and provides one or more bandwidth control signals to the one or more bandwidth control inputs. The filter control unit may further measure a noise level of the input signal. In that case the filter control unit may initially set each control signal to an all-pass value and maintain the all-pass values while the noise level is below a threshold noise level or while a tone event is not detected. The filter control unit may also adjust the bandwidth control signal to decrease bandwidth if the noise level achieves a threshold noise level while a tone event is detected. The filter control unit may further include a third input which receives the filtered input signal. And in that case, the filter control unit may adjust each bandwidth control signal based on SNR improvement between the input signal and the filtered input signal.

A tone event detection system according to an embodiment of the present invention includes an adaptive multi-bandpass filter, a tone detector, and a controller. The adaptive multi-bandpass filter filters a sampled input signal and provides a sampled filtered signal. The filter has multiple frequency inputs and corresponding bandwidth control inputs. The tone detector monitors the sampled filtered signal for tone events and provides a tone indication when a tone event is detected. The controller receives the tone indication, provides each frequency signal to a corresponding frequency input, and provides a bandwidth signal to a corresponding bandwidth control input for each frequency signal that is provided.

The adaptive multi-bandpass filter may include multiple adaptive bandpass filters, each passing a corresponding frequency with reduced phase shift. In one embodiment, the at least one frequency signal is $\cos(2\pi f/f_s)$ in which f is a frequency of a component of the tone event and $f_s$ is a sampling frequency of the sampled input signal.

A method of enhancing a tone event according to an embodiment of the present invention includes filtering an input signal to provide a filtered signal, monitoring the filtered signal and providing a tone indication when a tone event is indicated, and providing at least one filter control signal to update the adaptive multi-bandpass filter in response to the tone indication.

The method may include providing at least one frequency component signal and/or at least one bandwidth control signal. The method may include providing a frequency component signal and a corresponding bandwidth control signal, and bandpass filtering the input signal at a frequency that corresponds with the frequency component signal with a bandwidth that corresponds with the bandwidth control signal.

The method may include measuring a noise level of the input signal. In that case, the method may further include providing the bandwidth control signal to an all-pass value if the tone event is not indicated or if the noise level is below a threshold level. And the method may further include adjusting the bandwidth control signal based on the noise level if the noise level achieves a threshold level. The method may further include measuring an SNR improvement level between the input signal and the filtered signal, and adjusting the at least one control signal based on the SNR improvement level.

While particular embodiments of the present invention have been shown and described, it will be recognized to those skilled in the art that, based upon the teachings herein, further changes and modifications may be made without departing from this invention and its broader aspects. The appended claims are intended to encompass within their scope all such changes and modifications as are within the true spirit and scope of this invention.

What is claimed is:

1. An enhanced tone detector, comprising:
   an adaptive multi-bandpass filter having a signal input receiving an input signal, a signal output providing a filtered signal, and at least one control input for receiving at least one control signal;
   a tone detector having an input coupled to said signal output of said adaptive multi-bandpass filter and at least one output providing at least one tone detection signal when a tone event is detected within said filtered signal; and a filter control unit having a first input receiving said input signal, at least one second input receiving said at least one tone detection signal, and at least one first output providing said at least one control signal.

2. The enhanced tone detector of claim 1, wherein:
said adaptive multi-bandpass filter comprises a plurality of adaptive bandpass filters, each having a corresponding one of a plurality of frequency control inputs; and
wherein said filter control unit provides each of a plurality of frequency component signals to a corresponding one of said plurality of frequency control inputs.

3. The enhanced tone detector of claim 2, wherein said tone detector detects a tone event and provides said plurality of frequency component signals.

4. The enhanced tone detector of claim 2, further comprising:
each of said plurality of adaptive bandpass filters including a corresponding one of a plurality of bandwidth control inputs; and
wherein said filter control unit provides each of a plurality of bandwidth control signals to a corresponding one of said plurality of bandwidth control inputs.

5. The enhanced tone detector of claim 1, wherein:
said at least one control input of said adaptive multi-bandpass filter comprises at least one frequency control input and at least one bandwidth control input; and
wherein said filter control unit provides at least one frequency component signal to said at least one frequency control input and provides at least one bandwidth control signal to said at least one bandwidth control input.

6. The enhanced tone detector of claim 5, wherein said filter control unit measures a noise level of said input signal.

7. The enhanced tone detector of claim 6, wherein said filter control unit initially sets each of said at least one bandwidth control signal to an all-pass value and maintains said at least one bandwidth control signal to said all-pass value while said noise level is below a threshold noise level or when said tone event is not detected.

8. The enhanced tone detector of claim 6, wherein said filter control unit adjusts said at least one bandwidth control signal to decrease bandwidth if said noise level achieves a threshold noise level while said tone event is detected.

9. The enhanced tone detector of claim 5, wherein said filter control unit includes a third input receiving said filtered input signal, and wherein said filter control unit adjusts said at least one bandwidth control signal based on signal-to-noise ratio (SNR) improvement between said input signal and said filtered input signal.

10. A tone event detection system, comprising:
an adaptive multi-bandpass filter which filters a sampled input signal and provides a sampled filtered signal, and which has a plurality of frequency inputs and a corresponding plurality of bandwidth control inputs;

a tone detector which monitors said sampled filtered signal for tone events and which provides a tone indication when a tone event is detected within said sampled filtered signal; and a controller which receives said tone indication, which provides each of at least one frequency signal to a corresponding one of said plurality of frequency inputs, and which provides a bandwidth signal to a corresponding one of said plurality of bandwidth control inputs for each of said at least one frequency signal provided.

11. The tone event detection system of claim 10, wherein said adaptive multi-bandpass filter comprises a plurality of adaptive bandpass filters, each passing a corresponding frequency with reduced phase shift.

12. The tone event detection system of claim 10, wherein said at least one frequency signal is $\cos(2\pi/f_s)$ in which f is a frequency of a component of said tone event and $f_s$ is a sampling frequency of said sampled input signal.

13. A method of enhancing a tone event, comprising:
filtering an input signal with an adaptive multi-bandpass filter to provide a filtered signal;
monitoring the filtered signal and providing a tone indication when a tone event is indicated by the filtered signal; and
providing at least one filter control signal to update the adaptive multi-bandpass filter in response to the tone indication.

14. The method of claim 13, wherein said providing at least one filter control signal comprises providing at least one frequency component signal.

15. The method of claim 13, wherein said providing at least one filter control signal comprises providing at least one bandwidth control signal.

16. The method of claim 13, wherein:
said providing at least one filter control signal comprises providing a frequency component signal and a corresponding bandwidth control signal; and
wherein said filtering comprises bandpass filtering the input signal at a frequency that corresponds with the frequency component signal with a bandwidth that corresponds with the bandwidth control signal.

17. The method of claim 16, further comprising measuring a noise level of the input signal.

18. The method of claim 17, wherein said providing a corresponding bandwidth control signal comprises providing the bandwidth control signal to an all-pass value if the tone event is not indicated or if the noise level is below a threshold level.

19. The method of claim 17, wherein said providing a corresponding bandwidth control signal comprises adjusting the bandwidth control signal based on the noise level if the noise level achieves a threshold level.

20. The method of claim 13, further comprising:
measuring a signal-to-noise ratio (SNR) improvement level between the input signal and the filtered signal; and
wherein said providing at least one filter control signal comprises adjusting the at least one control signal based on the SNR improvement level.

* * * * *